United States Patent
Tan et al.

(10) Patent No.: US 6,853,752 B2
(45) Date of Patent: Feb. 8, 2005

(54) METHOD AND APPARATUS FOR DYNAMIC LOOP AND POST FILTERING

(75) Inventors: Thiow Keng Tan, Singapore (SG); Chee Yong Law, Singapore (SG)

(73) Assignee: Matsushita Electric Industrial Co., Ltd., Osaka (JP)

(*) Notice: Subject to any disclaimer, the term of this patent is extended or adjusted under 35 U.S.C. 154(b) by 707 days.

(21) Appl. No.: 09/812,683

(22) Filed: Mar. 21, 2001

(65) Prior Publication Data

US 2001/0036320 A1 Nov. 1, 2001

(30) Foreign Application Priority Data

Mar. 24, 2000 (JP) .......................................... 2000-084396

(51) Int. Cl.[7] .............................................. G06K 9/36
(52) U.S. Cl. ............................................................ 382/236
(58) Field of Search .................................. 382/232, 236, 382/238, 240, 250; 348/384.1, 394.1, 395.1, 400.1–404.1, 407.1–416.1, 420.1–421.1, 425.2, 430.1–431.1; 375/240.02–240.03, 240.12–240.16, 240.18, 240.2, 240.22–240.25

(56) References Cited

U.S. PATENT DOCUMENTS 6,215,822 B1 * 4/2001 Bose et al. ............. 375/240.16
6,404,815 B1 * 6/2002 Sekiguchi et al. ...... 375/240.16

OTHER PUBLICATIONS

International Standard ISO/IEC 14496–2: 1999(E), "Information technology–Coding of audio–visual objects–Part 2: Visual", pp. 290–295, Jan. 12, 1999.

* cited by examiner

*Primary Examiner*—Jose L. Couso
(74) *Attorney, Agent, or Firm*—Greenblum & Bernstein, P.L.C.

(57) ABSTRACT

This invention teaches a mechanism or method for automatically and dynamically switching between a post filter and a loop filter for a video decoder. This dynamic operation is done automatically based on encoding parameters that are derived from information found in the bit stream being decoded by the video decoder. Based on these parameters, the decoder decides that the frame store should be filled with the unfiltered reconstructed picture or the filtered reconstructed picture. The decision is done on a picture by picture basis. Regardless of the decision, the output display picture is always filtered.

33 Claims, 10 Drawing Sheets

BLOCK DIAGRAM SHOWING A PAIR OF ENCODER AND DECODER

LEGEND:
DCT - BLOCK BASED DISCRETE COSINE TRANSFORM
Q - QUANTIZATION
VLC - VARIABLE LENGTH CODING
FRAME STORE - STORAGE FOR PREVIOUS RECONSTRUCTED PICTURE
MOTION COMP - MOTION COMPENSATION MODULE
VLD - VARIABLE LENGTH DECODING
IQ - INVERSE QUANTIZATION
IDCT - INVERSE DISCRETE COSINE TRANSFORM

Fig.6

Fig.9 FLOWCHART FOR 3-STATE DYNAMIC SWITCHING DECISION

METHOD AND APPARATUS FOR DYNAMIC LOOP AND POST FILTERING

BACKGROUND OF THE INVENTION

The present invention relates to a method and an apparatus for a dynamic loop and post filtering. The method or apparatus for the dynamic loop and post filtering of decoded video is applicable to multimedia and video applications. In particular it is useful for the delivery of video over low bandwidth networks such as Internet where the picture quality is badly affected by a coding artefact such as blocky noise.

Filtering is a very common signal processing technique that is used to process a picture to enhance or change its appearance. Forms of the filtering can be broadly classified into two categories. They are picture enhancement and picture restoration. This disclosure mainly deals with the latter case of picture restoration. Degradation to the picture is introduced by the compression technique. In particular, the most common type of the degradation is a blocky artefact that results from high compression in a block-based transform-coding technique.

Figure 1:
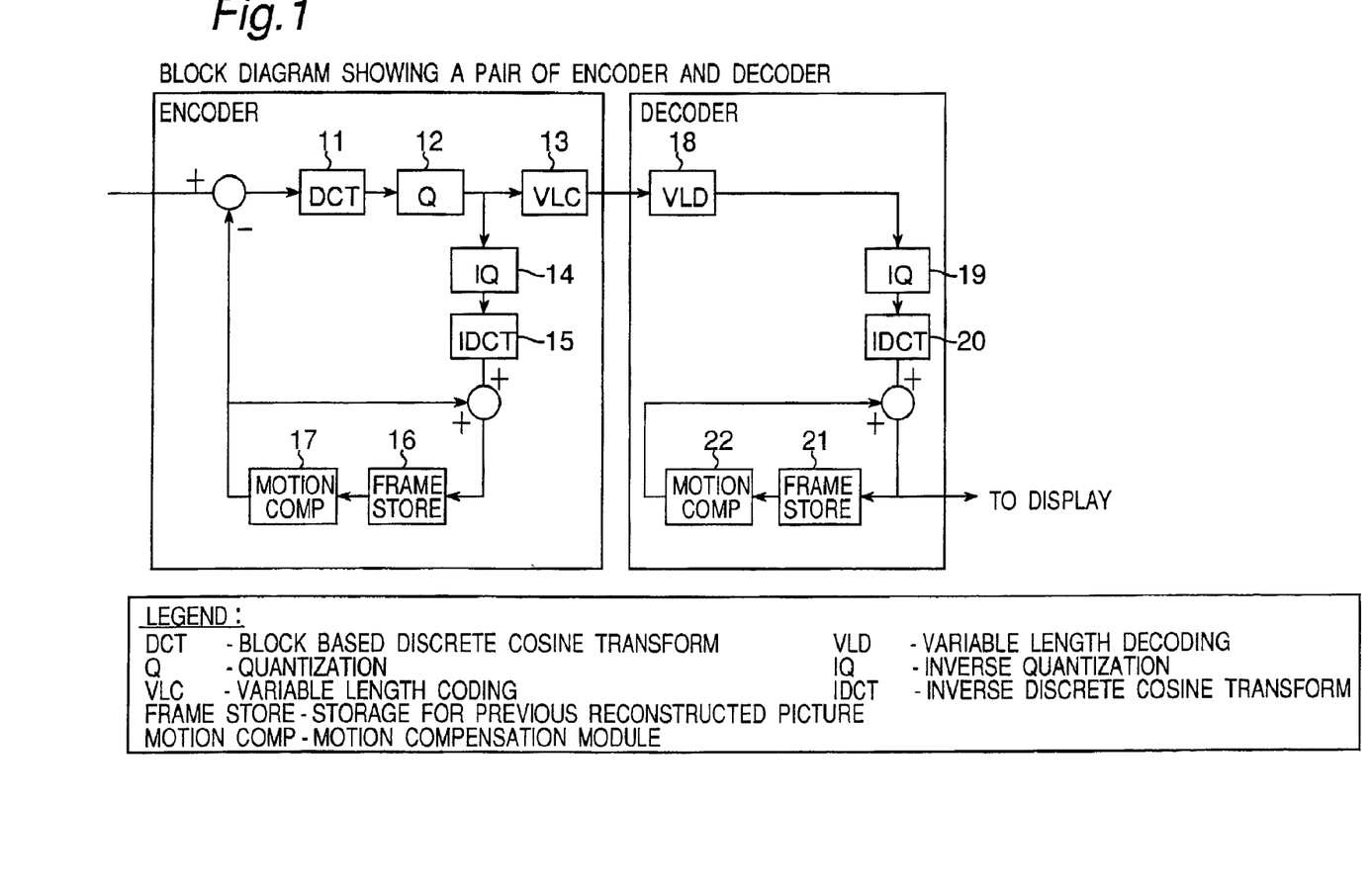
FIG. 1 is a block diagram showing a typical pair of encoder and decoder used for compression and decompression of moving pictures.

FIG. 1 shows a typical block-based transform codec (coder-decoder). As shown in FIG. 1, an encoder and a decoder form a synchronized pair. The encoder emulates decoding operations in a local decoder. The typical encoder comprises a block discrete cosine transform (DCT) module 11, a quantization (Q) module 12, a variable length coding (VLC) module 13, an inverse quantization (IQ) module 14, an inverse DCT (IDCT) module 15, a frame store module 16 and a motion compensation module 17. A picture is passed into the encoder where it is partitioned into blocks. Apart from the non-predicted picture (normally referred to as I-Pictures or Intra picture), the blocks undergo motion compensation where the previous decoded picture is subtracted from the current block. These blocks are then passed to the DCT module 11 where they are transformed into the DCT domain. The transform coefficients are then quantized by the Quantization module 12 and entropy-coded in the VLC module 13 before being sent to the decoder. The encoder also emulates the operations of the decoder by performing an inverse quantization step on the quantized coefficients and then transforming the coefficients back into the spatial domain. At this point, the motion compensated prediction, if it was used earlier, is added to the block to form the reconstructed picture. The reconstructed picture is stored in the frame store 16 where it is used by the motion compensation module 17 for the prediction of the next picture.

The typical corresponding decoder comprises of a variable length decoding (VLD) module 18, an inverse quantization (IQ) module 19, an inverse DCT (IDCT) module 20, a frame store module 21 and a motion compensation module 22. Noticed that apart from the VLD module 18 that performs the entropy decoding, the remaining modules 19 to 22 are identical to the modules 14 to 17 of the local decoder in the encoder. These modules perform the same function as described above.

The blocky artefact mentioned above is caused by the quantization step where noise is added to crucial low and high frequency components. This results in discontinuities at the block boundary of the picture, which shows up as blocky noise.

Figure 2:
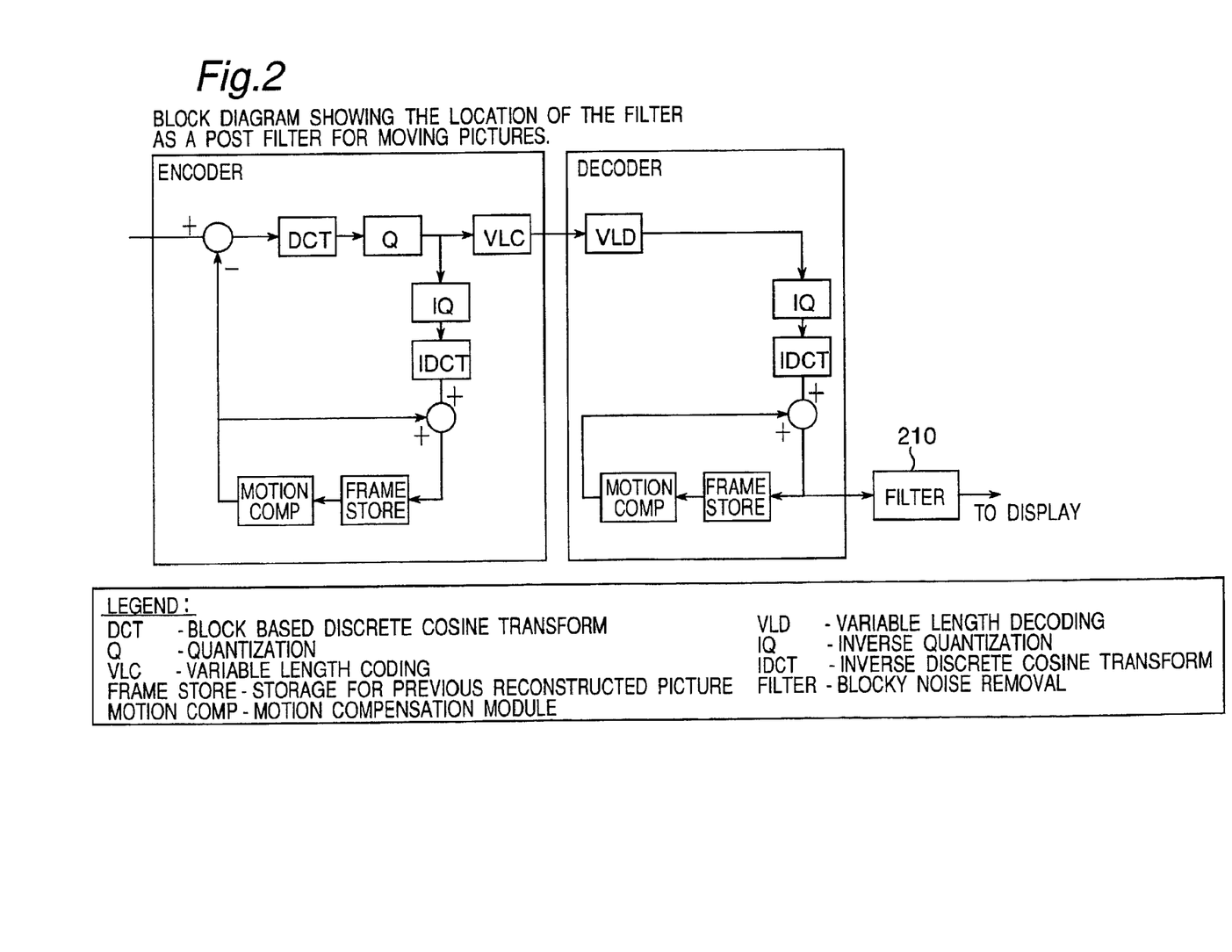
FIG. 2 is a block diagram showing the location of the filter as a post filter for the pair of encoder and decoder. Noticed that the post filter is placed at the output stage of the decoder and has neither influence nor impact on the encoding and decoding loops.
Figure 3:
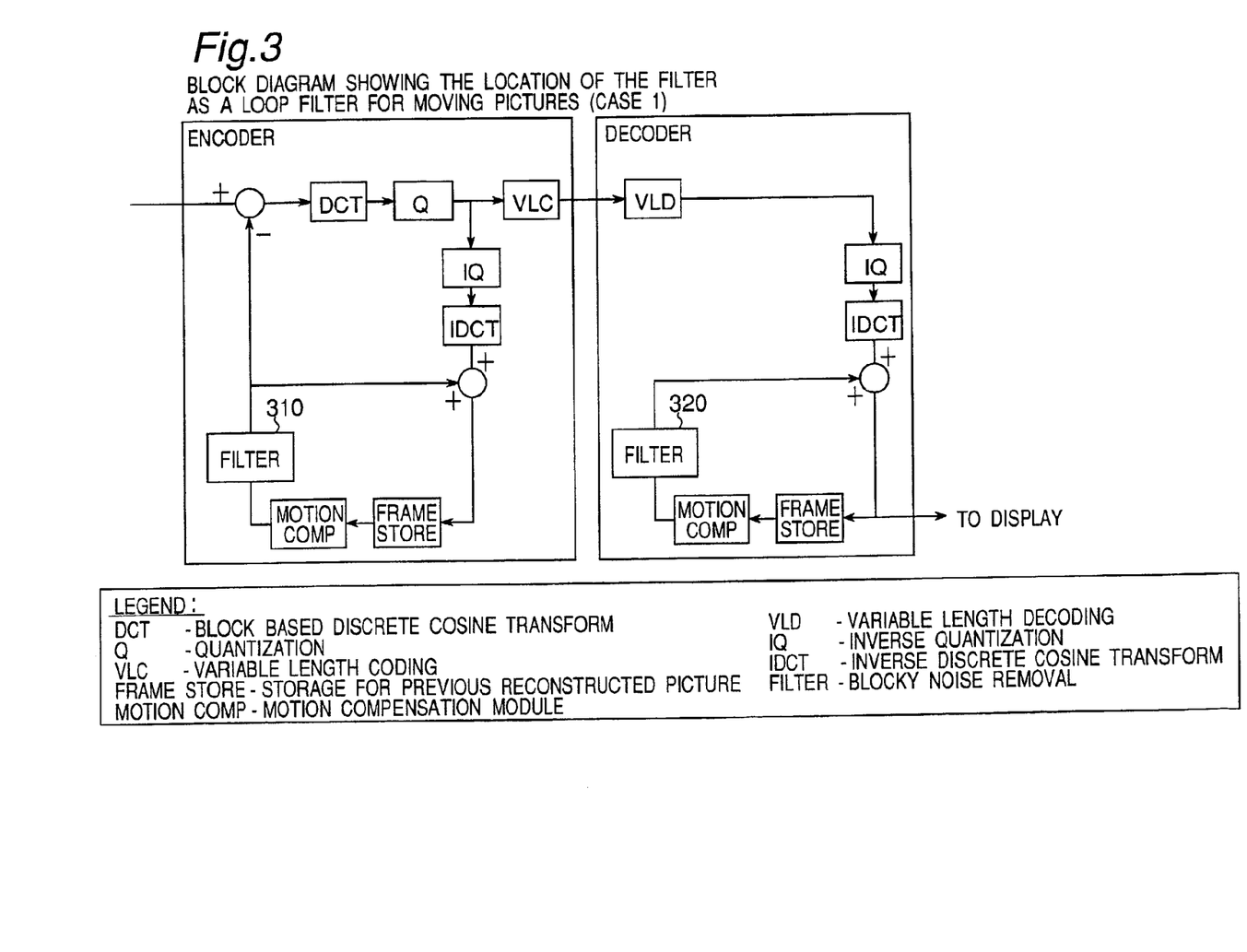
FIG. 3 is a block diagram showing the location of the filter as a loop filter for moving pictures (Case 1). The filter is placed in the motion compensation loop after the motion compensation module.
Figure 4:
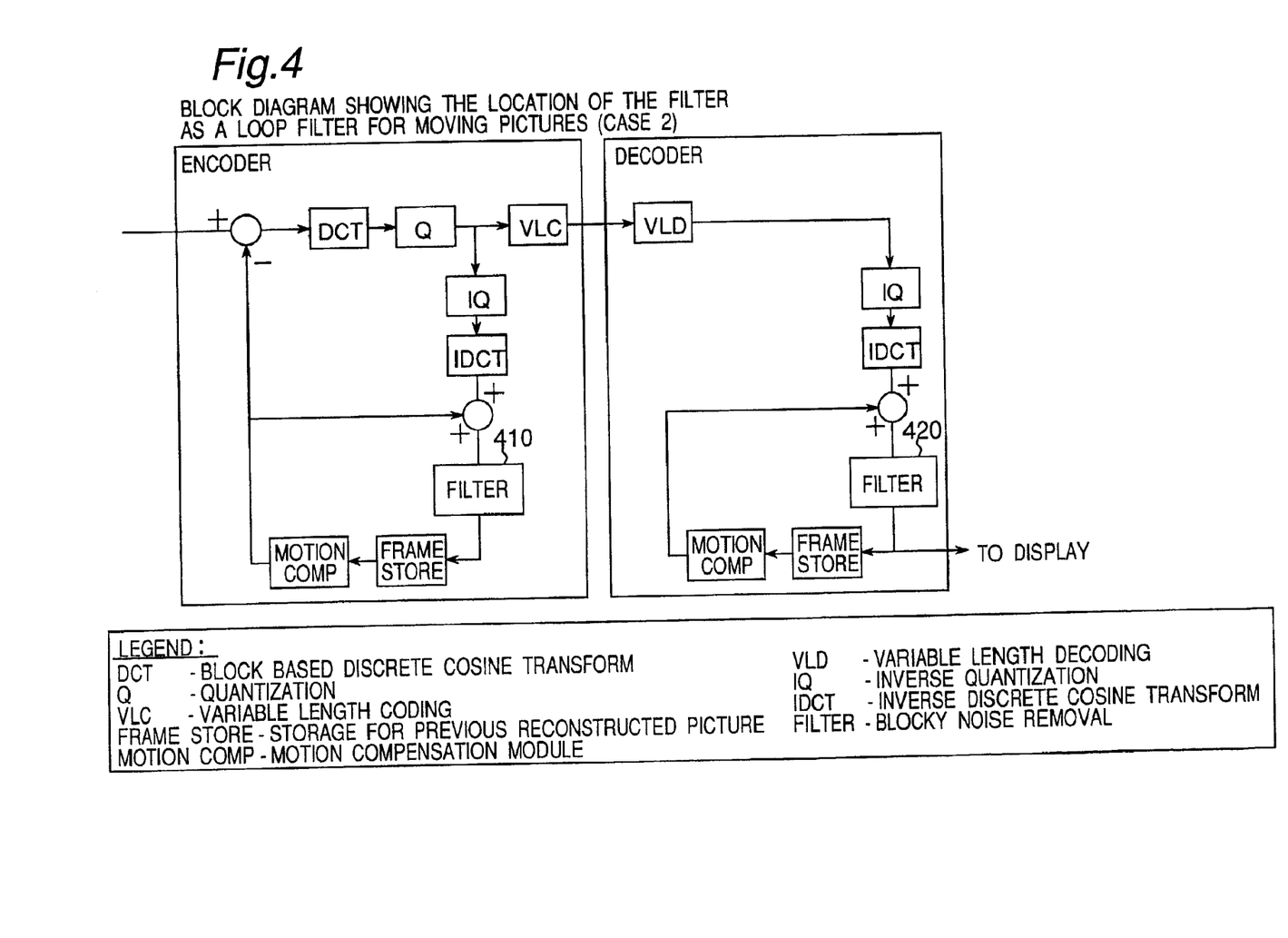
FIG. 4 is a block diagram showing the location of the filter as a loop filter for moving pictures (Case 2). The filter is placed in the motion compensation loop before the frame store module.

There are several forms of blocky noise removal filters. The first is a simple form of post filter 210, as shown in FIG. 2. This form of filter is placed at the output of the video decoder and only affects the picture being displayed. The second form of filter is a loop filter. This is placed in the motion compensation loop of the encoder and decoder. There are two places where the filter may be placed in the loop. The first is after the motion compensation block 310, as shown in FIG. 3. The second is before the frame store 410, as shown in FIG. 4. The first case is used in codecs such as the ITU-TH 261 standard. In this disclosure, the term of loop filter will refer to the second case where the filter is placed before the frame store 410.

In the case of the post filter, the filter affects only the output display picture. There is no propagation effect because the filtering effect is not stored in the frame memory. In the loop filter, there is a propagation effect of the filter because the filtered picture is stored into the frame memory and is used for the motion compensation of the subsequent picture.

Currently, the most effective filters used for filtering blocky noise uses knowledge that the discontinuities appear only at specific locations of the picture, namely at the block boundary. This allows the filter to remove the blocky noise without introducing excessive smoothing to the detail of the picture.

At high bit rates, where the motion compensation residual is coded by the transform coefficients, the post filtering technique is effective. The blocky noise present in the frame store is repaired by the transform coefficients being sent at subsequent pictures. So only the output picture need to be filtered. Putting the filter into the loop would actually cause propagation effect and reduce the overall picture quality.

At low bit rates, where the motion compensation residual is not completely coded, the loop filtering technique is more effective. This is because the blocky noise present in the frame store is not repaired by the transform coefficients being sent in subsequent pictures. Therefore, in the post filter case, the propagated blocky noise is not removed especially in the case where motion compensation has shifted the discontinuities to positions other than the block boundary.

Therefore, the first problem to be solved is how to integrate two types of filters since each of the filters is only effective at different ends to the bit rate distribution.

The second problem is how to keep the bit rate down in the low bit rate case when the loop filter is removing picture detail from the frame store.

SUMMARY OF THE INVENTION

The first problem is solved by dynamically switching between the post filter and the loop filter based on some criteria derived from the bit stream or picture content. The inventive step lies in the way the loop filter and the post filter are combined and switched on a picture by picture basis depending on the information extracted from the bit stream and/or the decoded picture. It is also possible for the encoder to signal the switching explicitly to the decoder by using a flag in the bit stream.

Implementing a mismatch between the local decoder in the encoder and the decoder solves the second problem. This allows for the same encoder to be used for both the post filter and loop filter cases. This is not entirely obvious and may even be theoretically incorrect since the main purpose of the local decoder in the encoder is to ensure that the reference frame of the encoder and decoder are always in synchronization. By deliberately introducing the loop filter in the decoder motion compensation loop only and not doing the same in the local decoder of the encoder, noise will accumulate and the two reference frames would go out of synchronization. This is commonly referred to as drift. However, at very low bit rates, the effect of the drift is smaller than the potential improvement in the potential quality of the decoded picture. Furthermore, the loop filter introduced also has some drift minimizing properties.

BRIEF DESCRIPTION OF THE DRAWINGS

Various characteristics and advantages of the present invention will be further described in details by the following preferred embodiments.

DETAILED DESCRIPTION OF THE PREFERRED EMBODIMENTS

This application is based on an application No. 2000-084396 filed in Japan, the content of which is herein expressly incorporated by reference in its entirety.

Figure 5:
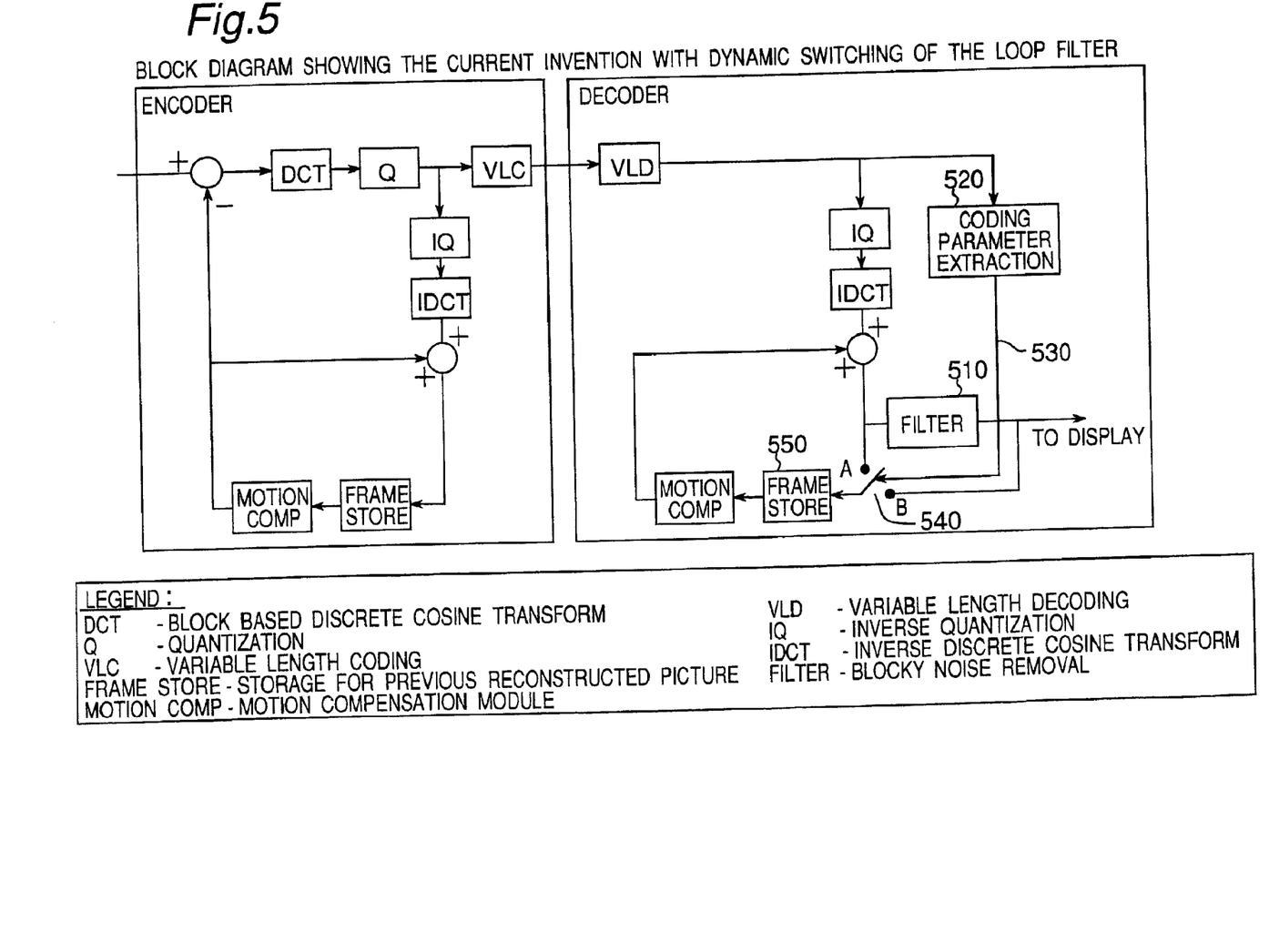
FIG. 5 is a block diagram showing the current invention with dynamic switching of the loop filter. A coding parameter extraction module is used to gather information about the picture in order to decide on the switch position to use for each picture.
Figure 7:
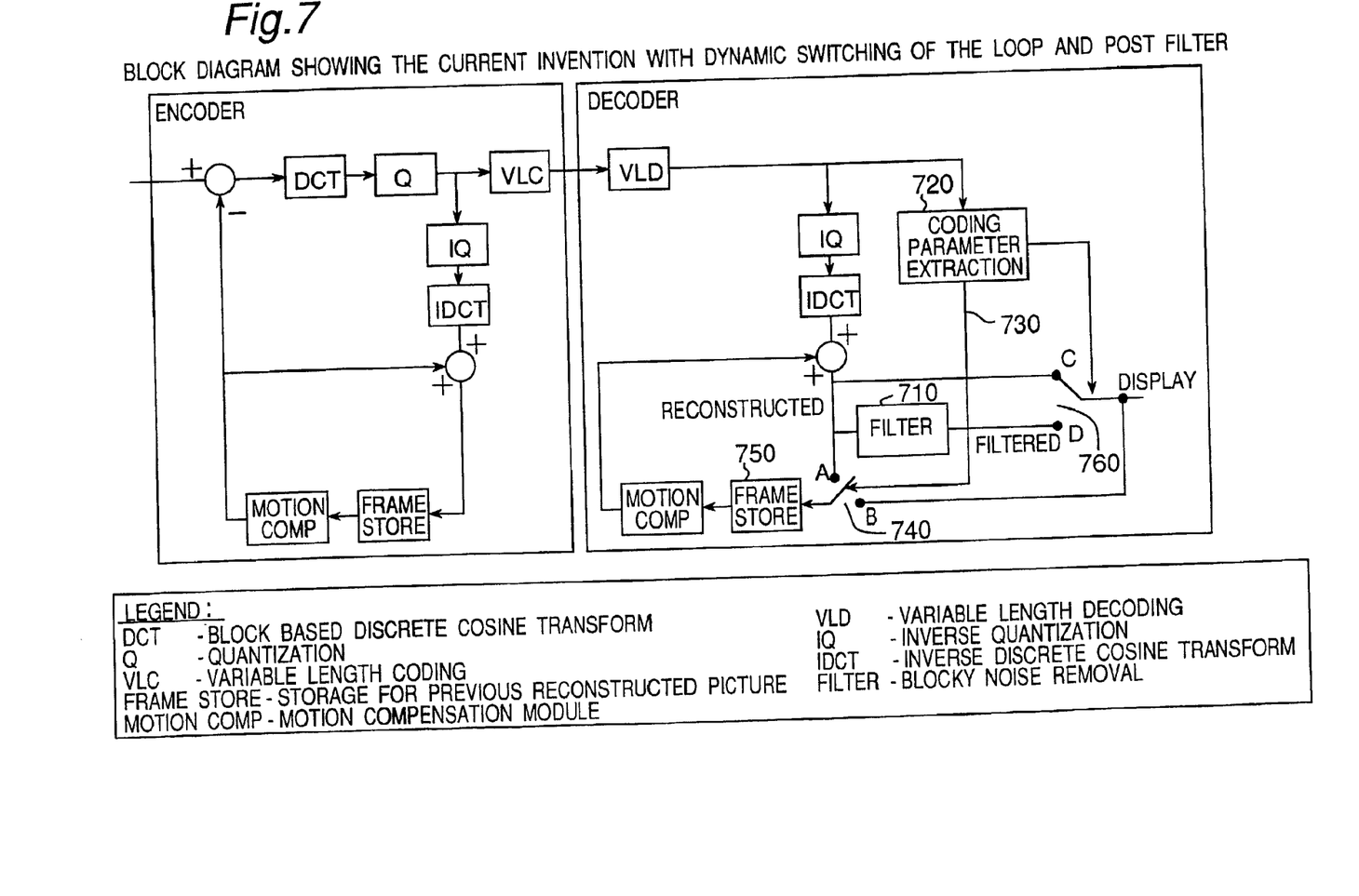
FIG. 7 is a block diagram showing the current invention with dynamic switching of the loop and post filter. A coding parameter extraction module is used to gather information about the picture in order to decide or the switch position to use for each picture.

Hereinafter, preferred embodiments of the present invention will be specifically described. An embodiment of the present invention is shown in FIGS. 5 and 7. This embodiment shows a case of the present invention where the encoder is not modified. At the decoder, a filter 510 is placed at the output of the video decoder. A new functional module referred to as a coding parameter extraction 520 is added. The purpose of this module is to extract the coding parameters of the current macroblock or picture. By extracting the information, the decoder can make a decision on whether to switch in the filter or not. This is done through the control line 530 and the switch 540.

In the present embodiment, the coding parameter extraction 520 calculates the mean value of the quantization parameter for the whole picture. The mean value is then used to decide if the current picture, which is stored in the frame store 550, should be from the unfiltered reconstructed picture or the filtered reconstructed picture. This is done via the switch 540. When the quantization parameter is small, this means the quality of the picture is good. In this case the output picture is filtered but the picture, which is placed in the frame store, is not filtered. This means that the switch should be at position A. When the quantization parameter is big, this means that the quality of the picture is bad and there is likely to be very blocky noise. In this case the output picture is filtered and the picture to be placed in the frame store is also filtered. This means that the switch should be at position B.

Figure 6:
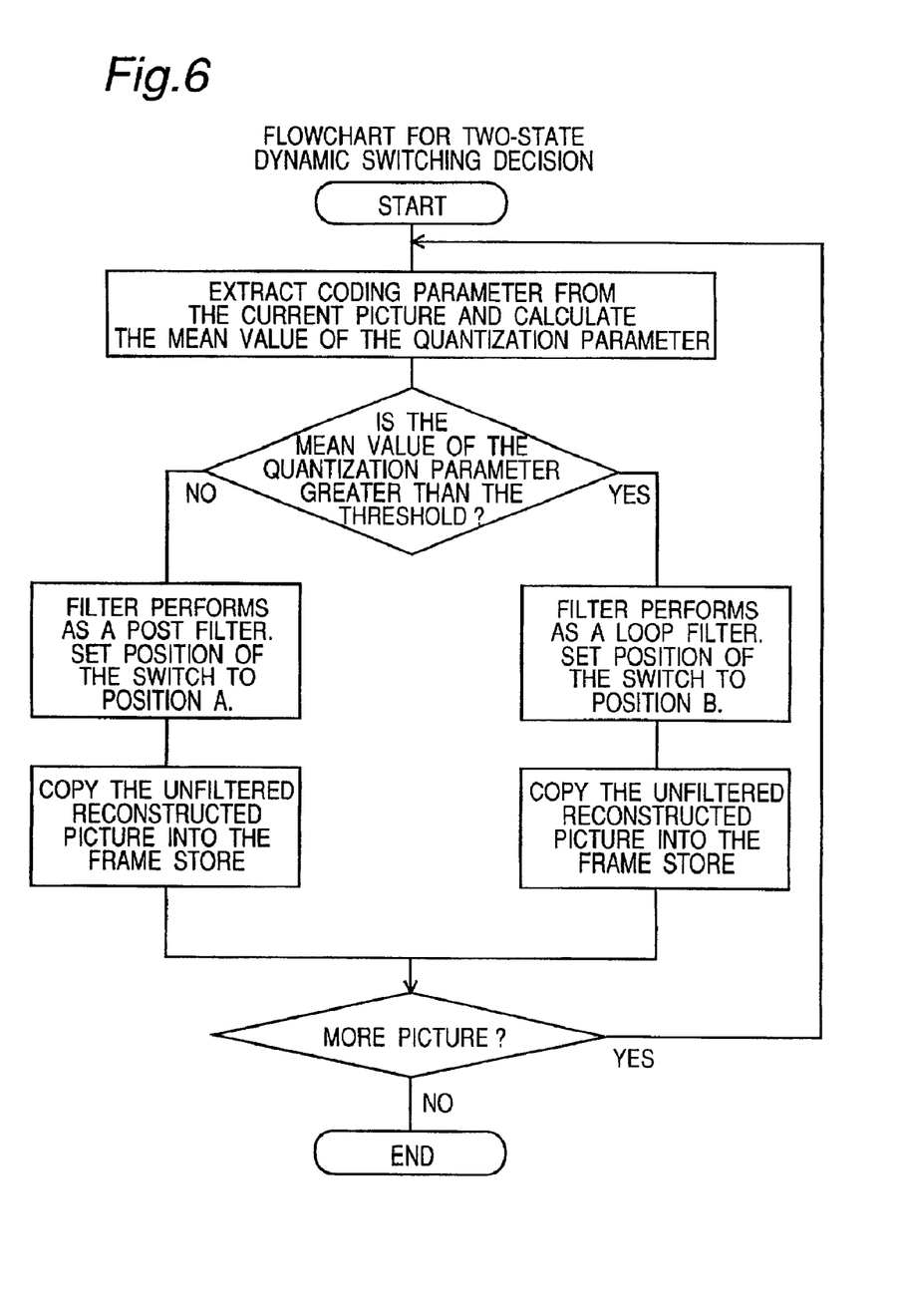
FIG. 6 is a flowchart for 2-state dynamic switching decision.

FIG. 6 shows the flowchart for this decision. The decision starts by calculating the mean value of the quanization parameters for the frame by summing all of the quantization parameters and dividing by the number of macro blocks in the picture. Once this value is obtained, it is compared to a predefined threshold. If the value is not greater than the threshold, then the switch is set to the position A. The unfiltered reconstructed picture is copied to the frame store. If the value is greater than the threshold, then the switch is set to the position B. The filtered reconstructed picture is copied to the frame store. The process then checks if there are more pictures to process. If there is, then the process repeats again with the next picture as the input.

Note that regardless of the location of the switch, the output picture sent to the display is always from the filtered reconstructed picture.

FIG. 7 shows a variant of the invention depicted in FIG. 5. Most of the components are the same as that discussed previous except that an additional option that further improves the output image. An additional switch provides options C and D. At position D, the filter works as discussed previously. At position C, the output is not filtered at both the display and the frame store. This option is provided for the case where the quantization parameter is neither too big to perform a loop filtering (filtering both the frame display and frame store image) nor too small to perform a post filtering (only display image is filtered). In this case, we now have two threshold values; an upper threshold value and a lower threshold value. If the average quantization parameter value exceeds the upper threshold value, loop filtering is performed. If the average quantization parameter value is below the lower threshold value, post filtering is performed. Otherwise, no filtering is performed at all.

Figure 8:
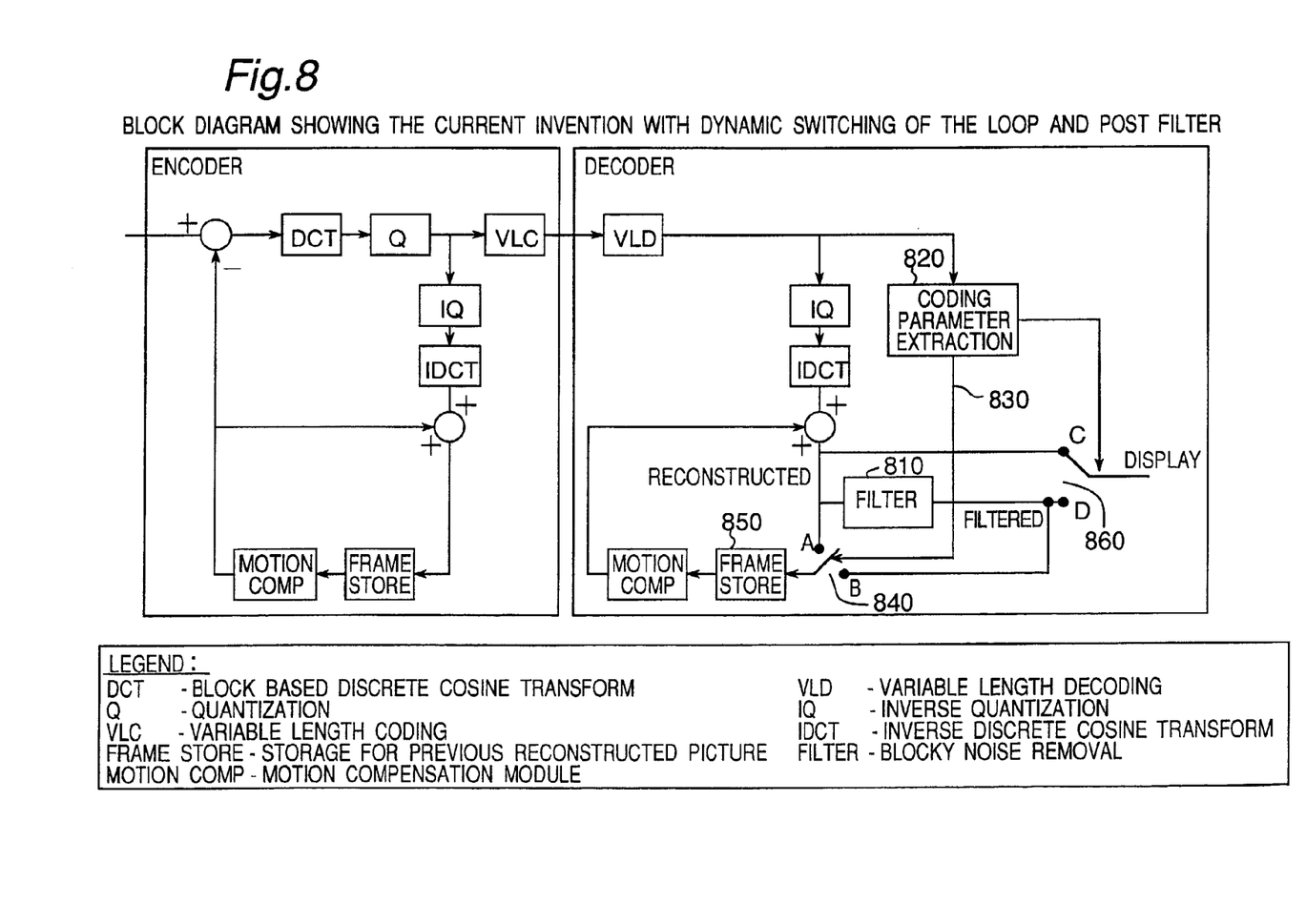
FIG. 8 is a block diagram showing the current invention with dynamic switching of the loop and post filter. The loop filter is independent of the post filter. A coding parameter extraction module is used to gather information about the picture in order to decide on the switch position to use for each picture.

In another embodiment of the present invention shown in FIG. 8, the loop filter is now independent of the post filter. In FIG. 7, when the switch for the loop filter is in position B, the selected picture depends on the selection of switch C and D. In FIG. 8, when the switch for the loop filter is in position B, the selected picture does not depend on the selection of switch C and D.

Figure 9:
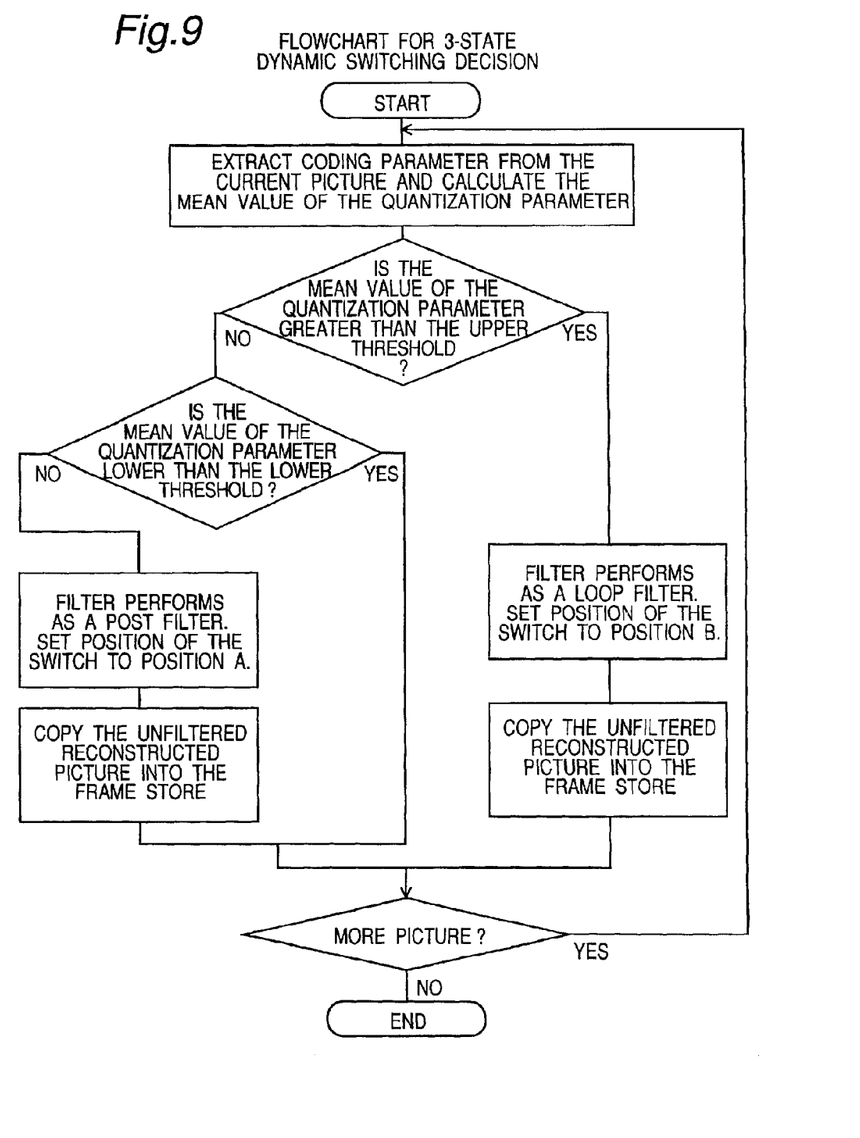
FIG. 9 is a flowchart for 3-state dynamic switching decision.

FIG. 9 shows the flowchart of the switching algorithm with the new option included. The only difference occurs when the threshold is lower. A new decision has to be made to determine if the quantization parameter is lower than a specified lower threshold. If it is lower, it will operate as before, that is, filtering output frame but stores the unfiltered frame in the frame store. Otherwise, unfiltered frame is output to the display and kept in the frame store.

The coding parameter extraction can also take several other forms. In the above embodiment, it is assumed that the coding parameters are extracted or deduced from information that are available in the bit stream as part of the decoding process. Quantization step-size is one of such parameters. However, it is also possible that the information for making decision on the switching be obtained either implicitly or explicitly. In the implicit case, the reconstructed picture is analyzed and the appropriate decision is derived. In the explicitly case, the encoder makes the decision and explicitly signals it to the decoder by sending a flag or parameter in the bit stream or by other forms of communication protocol.

Figure 10:
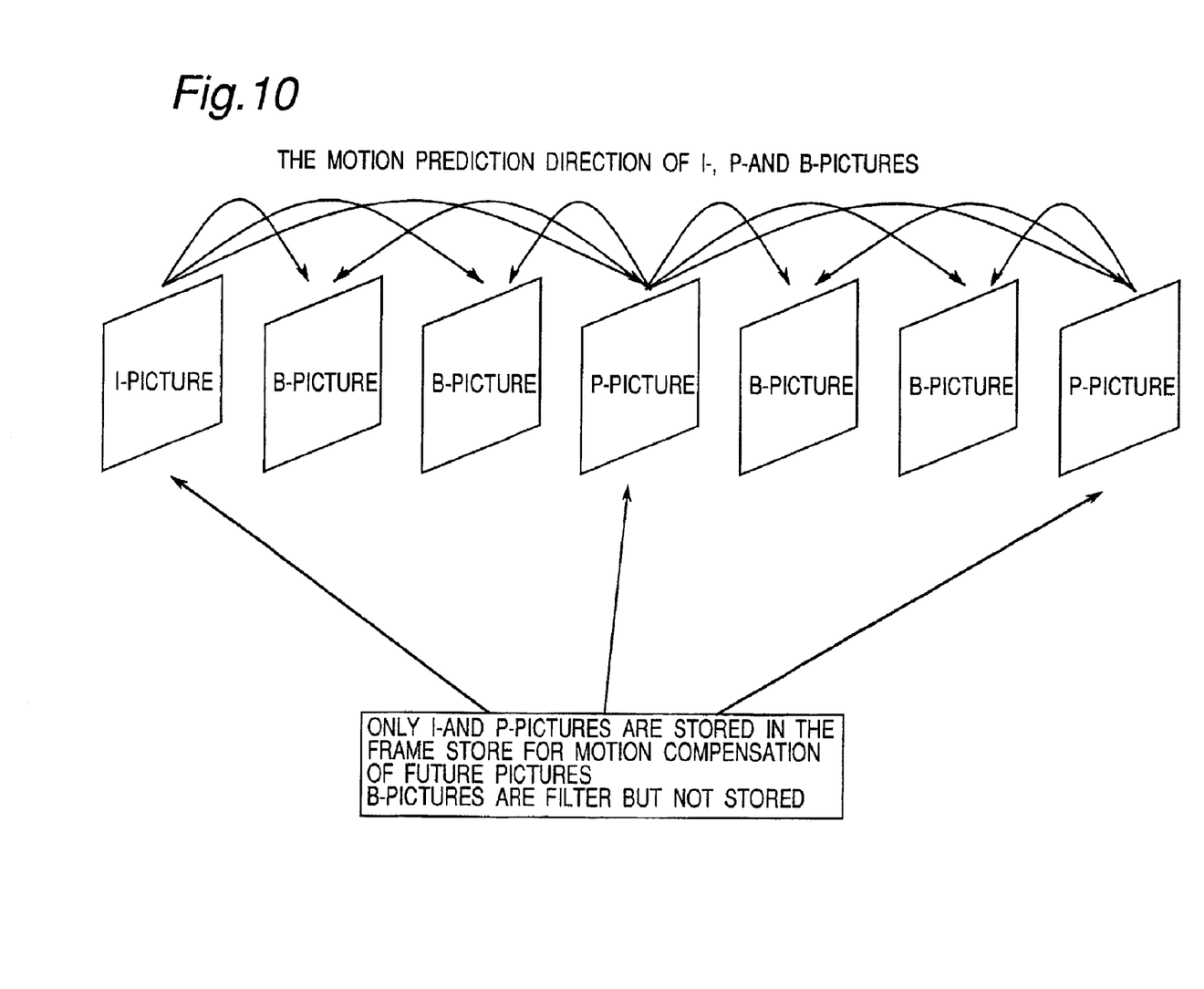
FIG. 10 is a view of the motion prediction direction of I-, P- and B-pictures. This figure shows the direction of the motion compensation. Only I-, and P- pictures are stored in the frame store since they are used for the prediction of the future pictures. B-Pictures are not used for prediction and therefore need not be stored in the frame store.

In the case where the encoded sequence contains I-, P- and B-pictures, only the I- and P-pictures need to be stored into the frame store. This is because a B-picture is bi-directionally predicted from its neighboring I- or P-pictures and is not used for the prediction of any other pictures. FIG. 10 shows the prediction method used. The arrows point from the picture used for prediction to the predicted picture.

This invention can operate on a macro block basis. Instead of making a decision to filter or not filter the entire picture based on the average quantization parameter value, we can choose to filter a macro block based on the corresponding quantization parameter value. In other words, every macro block is filtered or not filtered independent of each other, it is only based on its quantization parameter value.

The effects of the present invention are that a new dynamic switching loop and post filter technique is derived. This filtering technique is effective in reducing the noise in low quality heavily compressed video and at the same time does not reduce the sharpness of high quality lightly compressed video.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method of improving picture quality in encoding of digitally compressed video, the method comprising:

encoding a sequence of picture information, one picture per time interval, into a coded representation as locally reconstructed pictures;

filtering one of the locally reconstructed pictures to obtain a locally filtered picture;

selecting, based on an average value of a quantization parameter, a local reference picture from one of the locally reconstructed picture and the locally filtered picture for a same time interval; and using the local reference picture to predict a motion compensation of a next picture in the encoding.

2. A method of improving picture quality in decoding of digitally compressed video, the method comprising:

decoding a coded representation, one picture per time interval, into a sequence of reconstructed pictures;

filtering one of the reconstructed pictures to obtain a filtered picture;

selecting, based on an average value of a quantization parameter, a reference picture from one of the reconstructed picture and the filtered picture for a same time interval; and using the reference picture to predict a motion compensation of a next picture in the decoding.

3. A method of improving picture quality of digitally compressed video, the method comprising:

encoding a sequence of picture information, one picture per time interval, into a coded representation;

decoding the coded representation, one picture per time interval, into a sequence of reconstructed pictures;

filtering one of the reconstructed pictures to obtain a filtered picture;

selecting, based on an average value of a quantization parameter, a reference picture from one of the reconstructed picture and the filtered picture for a same time interval; and using the reference picture to predict a motion compensation of a next picture in the decoding.

4. A method of improving picture quality in decoding of digitally compressed video, the method comprising:

decoding a coded representation into a sequence of reconstructed pictures, one picture per time interval;

filtering one of the reconstructed pictures to obtain a filtered picture;

selecting a display picture from a group consisting of the reconstructed picture and the filtered picture for a same time interval;

sending the display picture to an output of a decoder;

selecting a reference picture from a group consisting of the reconstructed picture and the filtered picture for a same time interval; and using the reference picture to predict a motion compensation of a next picture in the decoding.

5. A method of improving picture quality in decoding of digitally compressed video, the method comprising:

decoding a coded representation into a sequence of reconstructed pictures, one picture per time interval;

filtering one of the reconstructed pictures to obtain a filtered picture;

selecting a display picture from a group consisting of the reconstructed picture and the filtered picture of a same time interval;

sending the display picture to an output of a decoder;

selecting a reference picture from a group consisting of the reconstructed picture and the display picture for a same time interval; and using the reference picture to predict a motion compensation of a next picture in the decoding.

6. The method according to claim 1, wherein obtaining the filtered picture operates on a sub-portion of the picture by comparing quantization parameters of each sub-portion of the picture.

7. The method according to claim 1, wherein selecting the reference picture comprises:

deriving a switching criterion from the coded representation; and using the switching criterion for the selection step.

8. The method according to claim 1, wherein selecting the reference picture comprises:
deriving a switching criterion from the reconstructed picture; and
using the switching criterion for the selection.

9. The method according to claim 7, wherein deriving the switching criterion comprises:
extracting a plurality of quantization parameters from the coded representation;
calculating the average quantization parameter for the picture; and
comparing the average quantization parameter to a predefined threshold.

10. The method according to claim 7, wherein deriving the switching criterion comprises:
extracting a plurality of quantization parameters from the coded representation;
calculating the average quantization parameter for the picture; and
comparing the average quantization parameter to a plurality of predefined thresholds.

11. The method according to claim 9, further comprising:
producing an output image that is filtered when the quantization parameter is above a first threshold; and
storing the reference picture that is filtered when the quantization parameter is above a second threshold.

12. An apparatus for improving picture quality in encoding of digitally compressed video, said apparatus comprising:
encoding means for encoding a sequence of picture information, one picture per time interval, into a coded representation of locally reconstructed pictures;
means for filtering one of said locally reconstructed pictures to obtain a locally filtered picture;
means for selecting, based on an average value of a quantization parameter, a local reference picture from one of said locally reconstructed picture and said locally filtered picture for a same time interval; and
means for using said local reference picture to predict a motion compensation of a next picture in said encoding means.

13. An apparatus for improving picture quality in decoding of digitally compressed video, said apparatus comprising:
decoding means for decoding a coded representation, one picture per time interval, into a sequence of reconstructed pictures;
means for filtering one of said reconstructed pictures to obtain a filtered picture;
means for selecting, based on an average value of a quantization parameter, a reference picture from one of said reconstructed picture and said filtered picture for a same time interval; and
means for using said reference picture to predict a motion compensation of a next picture in said decoding means.

14. An apparatus for improving picture quality of digitally compressed video, said apparatus comprising:
encoding means for encoding a sequence of picture information, one picture per time interval, into a coded representation;
decoding means for decoding said coded representation, one picture per time interval, into a sequence of reconstructed pictures;
means for filtering one of said reconstructed pictures to obtain a filtered picture;
means for selecting, based on an average value of a quantization parameter, a reference picture from a one of said reconstructed picture and said filtered picture for a same time interval; and
means for using said reference picture to predict a motion compensation of a next picture in said decoding means.

15. An apparatus for improving picture quality in decoding of digitally compressed video, said apparatus comprising:
decoding means for decoding a coded representation into a sequence of reconstructed pictures, one picture per time interval;
means for filtering one of said reconstructed pictures to obtain a filtered picture;
means for selecting a display picture from a group consisting of said reconstructed picture and said filtered picture for a same time interval;
means for sending said display picture to an output of a decoder;
means for selecting a reference picture from a group consisting of said reconstructed picture and said filtered picture for a same time interval; and
means for using said reference picture to predict a motion compensation of a next picture in said decoding means.

16. An apparatus for improving picture quality, in decoding of digitally compressed video, said apparatus comprising:
decoding means for decoding a coded representation into a sequence of reconstructed pictures, one picture per time interval;
means for filtering one of said reconstructed pictures to obtain a filtered picture;
means for selecting a display picture from a group consisting of said reconstructed picture and said filtered picture for a same time interval;
means for sending said display picture to an output of a decoder;
means for selecting a reference picture from a group consisting of said reconstructed picture and said display picture for a same time interval; and
means for using said reference picture to predict a motion compensation of a next picture in said decoding means.

17. The apparatus according to claim 12, wherein said means for obtaining said filtered picture operates on a sub-portion of the picture by comparing quantization parameters of each sub-portion of the picture.

18. The apparatus according to claim 12, wherein said means for selecting said reference picture comprises:
means for deriving a switching criterion from the coded representation; and
means for using said switching criterion for said selection means.

19. The apparatus according to claim 12, wherein said means for selecting said reference picture comprises:
means for deriving a switching criterion from the reconstructed picture; and
means for using said switching criterion for said selection means.

20. The apparatus according to claim 18, wherein said means for deriving said switching criterion comprises:
means for extracting a plurality of quantization parameters from the coded representation;

means for calculating said average quantization parameter for the one of the reconstructed pictures; and means for comparing said average quantization parameter to a predefined threshold.

21. The apparatus according to claim 18, wherein said means for deriving said switching criterion comprises:

means for extracting a plurality of quantization parameters from the coded representation;

means for calculating said average quantization parameter for the one of the reconstructed pictures; and means for comparing said average quantization parameter to a plurality of predefined thresholds.

22. The apparatus according to claim 20, further comprising:

means for producing an output image that is filtered when said quantization parameter is above a specified higher threshold; and means for storing said reference picture that is filtered when said quantization parameter is below a specified lower threshold.

23. An apparatus for improving picture quality in encoding of digitally compressed video, said apparatus comprising:

an encoder that encodes a sequence of picture information, one picture per time interval, into a coded representation of locally reconstructed pictures;

a filter that filters one of said locally reconstructed pictures to obtain a locally filtered picture;

a selector that selects, based on an average value of a quantization parameter, a local reference picture from one of said locally reconstructed picture and said locally filtered picture for a same time interval; and a predictor that uses said local reference picture to predict a motion compensation of a next picture in said encoder.

24. An apparatus for improving picture quality in decoding of digitally compressed video, said apparatus comprising:

a decoder that decodes a coded representation, one picture per time interval, into a sequence of reconstructed pictures;

a filter that filters one of said reconstructed pictures to obtain a filtered picture;

a selector that selects, based on an average value of a quantization parameter, a reference picture from one of said reconstructed picture and said filtered picture for a same time interval; and a predictor that uses said reference picture to predict a motion compensation of a next picture in said decoder.

25. An apparatus for improving picture quality of digitally compressed video, said apparatus comprising:

an encoder that encodes, one picture per time interval, a sequence of picture information into a coded representation;

a decoder that decodes, one picture per time interval, said coded representation into a sequence of reconstructed pictures;

a filter that filters one of said reconstructed pictures to obtain a filtered picture;

a selector that selects, based on an average value of a quantization parameter, a reference picture from one of said reconstructed picture and said filtered picture for a same time interval; and a predictor that uses said reference picture to predict a motion compensation of a next picture in said decoder.

26. An apparatus for improving picture quality in decoding of digitally compressed video, said apparatus comprising:

a decoder that decodes, one picture per time interval, a coded representation into a sequence of reconstructed pictures;

a filter that filters one of said reconstructed pictures to obtain a filtered picture;

a selector that selects a display picture from one of said reconstructed picture and said filtered picture for a same time interval;

a sender that sends said display picture to an output of a decoder;

a selector that selects a reference picture from a group consisting of said reconstructed picture and said filtered picture for a same time interval; and a predictor that uses said reference picture to predict a motion compensation of a next picture in said decoder.

27. An apparatus for improving picture quality in decoding of digitally compressed video, said apparatus comprising:

a decoder that decodes, one picture per time interval, a coded representation into a sequence of reconstructed pictures;

a filter that filters one of said reconstructed pictures to obtain a filtered picture;

a selector that selects a display picture from one of said reconstructed picture and said filtered picture for a same time interval;

a sender that sends said display picture to an output of a decoder;

a selector that selects a reference picture from a group consisting of said reconstructed picture and said display picture for a same time interval; and a predictor that uses said reference picture to predict a motion compensation of a next picture in said decoder.

28. The apparatus according to claim 23, wherein said filter operates on a sub-portion of the picture by comparing quantization parameters of each sub-portion of the picture.

29. The apparatus according to claim 23, wherein said selector comprises:

a deriver that derives a switching criterion from the coded representation, wherein said selector uses said switching criterion.

30. The apparatus according to claim 23, wherein said selector comprises:

a deriver that derives a switching criterion from the reconstructed picture, wherein said selector uses said switching criterion.

31. The apparatus according to claim 29, wherein said deriver comprises:

an extractor that extracts a plurality of quantization parameters from the coded representation;

a calculator that calculates said average quantization parameter for one of the reconstructed pictures; and a comparer that compares said average quantization parameter to a predefined threshold.

32. The apparatus according to claim 29, wherein said deriver comprises:

an extractor that extracts a plurality of quantization parameters from the coded representation;

a calculator that calculates said average quantization parameter for one of the reconstructed pictures; and a comparer that compares said average quantization parameter to a plurality of predefined thresholds.

33. The apparatus according to claim 31, further comprising:

a producer that produces an output image that is filtered when said quantization parameter is above a specified higher threshold; and a storage that stores said reference picture that is filtered when said quantization parameter is below a specified lower threshold.

* * * * *